US008678889B2

(12) United States Patent
Dean

(10) Patent No.: US 8,678,889 B2
(45) Date of Patent: Mar. 25, 2014

(54) EXHAUST SYSTEM

(76) Inventor: Jerome Dean, Allendale, NJ (US)

(*) Notice: Subject to any disclaimer, the term of this patent is extended or adjusted under 35 U.S.C. 154(b) by 1221 days.

(21) Appl. No.: 12/584,344

(22) Filed: Sep. 2, 2009

(65) Prior Publication Data

US 2011/0053489 A1 Mar. 3, 2011

(51) Int. Cl.

| | |
|---|---|
| ***F24F 7/007*** | (2006.01) |
| ***F24F 7/013*** | (2006.01) |
| ***F24F 7/06*** | (2006.01) |
| *B23Q 3/06* | (2006.01) |

(52) U.S. Cl.

USPC ............. 454/354; 269/905; 269/97; 269/260; 269/3; 269/6; 269/143; 269/249; 269/95; 269/130; 269/131

(58) Field of Classification Search

USPC ............ 454/354; 269/905, 97, 260, 3, 6, 143, 269/249, 95, 131, 130

See application file for complete search history.

(56) References Cited

U.S. PATENT DOCUMENTS

| | | | | | |
|---|---|---|---|---|---|
| 873,971 | A | | 12/1907 | Walsh | |
| 1,369,747 | A | * | 2/1921 | Jordan | 269/249 |
| 1,861,079 | A | * | 5/1932 | Bynum | 29/256 |
| 2,121,278 | A | * | 6/1938 | Babeock | 454/207 |
| 2,165,650 | A | | 7/1939 | Pfautsch | |
| 2,329,008 | A | * | 9/1943 | Smith | 294/67.5 |
| 2,592,174 | A | * | 4/1952 | O'Connell | 454/200 |
| 2,642,905 | A | * | 6/1953 | Hewat | 269/93 |
| 4,039,129 | A | * | 8/1977 | Berkeland et al. | 248/664 |
| 4,222,318 | A | * | 9/1980 | Patton et al. | 454/209 |
| 4,278,411 | A | * | 7/1981 | Anderson | 425/100 |
| 4,515,070 | A | | 5/1985 | Bobjer et al. | |
| 4,662,268 | A | | 5/1987 | Beavers | |
| 4,828,210 | A | * | 5/1989 | Anderson et al. | 248/229.15 |
| 4,886,233 | A | * | 12/1989 | Bateman et al. | 248/647 |
| 4,962,918 | A | * | 10/1990 | Yang | 269/249 |

(Continued)

FOREIGN PATENT DOCUMENTS

JP 2006266659 A * 10/2006

OTHER PUBLICATIONS

Cao, CN 101929471 A English abstract, Dec. 29, 2010.*

*Primary Examiner* — Kang Hu
*Assistant Examiner* — Phillip E Decker

(57) ABSTRACT

An exhaust system includes an exhaust fan having a frame within which fan blades and a motor are secured. The frame includes an upper sidewall, a bottom sidewall, a first lateral sidewall and a second lateral sidewall, defining an inlet opening and an outlet opening on opposite sides of the frame. A flexible exhaust boot is secured to the frame of the exhaust fan adjacent the outlet opening. The exhaust boot is a flexible piece of material having a substantially tubular configuration with a first end having an opening and a second end having an opening. A support assembly secures the exhaust fan and exhaust boot in position adjacent an opening. The support assembly includes a vertical bracket having a first end and a second end, and an outwardly extending support block is mounted at the first end of the vertical bracket. The support assembly also includes a horizontal bracket extending substantially perpendicular to the vertical bracket. The horizontal bracket is shaped and dimensioned to pass through a connection opening in the second end of the vertical bracket, and the horizontal bracket includes first end and a second end. The first end of the horizontal bracket extends outwardly from the same side of the vertical bracket as the support block. A strap is selectively connected to the exhaust fan.

18 Claims, 9 Drawing Sheets

(56) References Cited

U.S. PATENT DOCUMENTS

| | | | | | |
|---|---|---|---|---|---|
| 5,050,831 | A * | 9/1991 | Joyal | 248/208 |
| 5,368,262 | A * | 11/1994 | Garrity | 454/208 |
| 5,413,298 | A * | 5/1995 | Perreault | 248/228.6 |
| 5,425,671 | A * | 6/1995 | Cunning | 454/209 |
| 5,702,296 | A | 12/1997 | Grano | |
| 6,048,264 | A | 4/2000 | Campbell | |
| 6,079,703 | A * | 6/2000 | Chavez, Jr. | 269/147 |
| 6,126,415 | A * | 10/2000 | Lasko | 454/205 |
| 6,564,512 | B1 | 5/2003 | Whittemore | |
| 6,702,664 | B1 * | 3/2004 | Coven | 454/200 |
| 6,848,683 | B2 * | 2/2005 | Foshag et al. | 269/3 |
| 7,073,754 | B2 * | 7/2006 | Shuey | 248/72 |
| 7,350,759 | B1 * | 4/2008 | Gray | 454/204 |
| 7,484,310 | B2 * | 2/2009 | Jaffers et al. | 269/143 |
| 8,226,074 | B1 * | 7/2012 | Hughey | 269/155 |
| 2002/0006774 | A1 * | 1/2002 | Kilburn et al. | 454/341 |
| 2007/0023596 | A1 * | 2/2007 | Bilsky | 248/228.6 |
| 2009/0212593 | A1 * | 8/2009 | Larson | 296/158 |
| 2011/0155365 | A1 * | 6/2011 | Wiese | 165/244 |

* cited by examiner

EXHAUST SYSTEM

BACKGROUND OF THE INVENTION

1. Field of the Invention

The present invention relates to an exhaust system for drawing air and dust from an enclosed room to an external environment. More particularly, the invention relates to an exhaust system composed of an exhaust fan with an exhaust boot secured thereto, the exhaust fan and exhaust boot being secured within a window opening via a support assembly.

2. Description of the Related Art

As those working within the construction industry will readily acknowledge providing for the exhaust of rooms in which construction work is taking place can be difficult given the variable sizes of the windows within the room and the framework surrounding the windows. The present invention provides a portable exhaust system allowing for use in conjunction with various window openings and in conjunction with various framework that might be surrounding a window.

SUMMARY OF THE INVENTION

It is, therefore, an object of the present invention to provide an exhaust system including an exhaust fan having a frame within which fan blades and a motor are secured. The frame includes an upper sidewall, a bottom sidewall, a first lateral sidewall and a second lateral sidewall, defining an inlet opening and an outlet opening on opposite sides of the frame. A flexible exhaust boot is secured to the frame of the exhaust fan adjacent the outlet opening. The exhaust boot is a flexible piece of material having a substantially tubular configuration with a first end having an opening and a second end having an opening. A support assembly secures the exhaust fan and exhaust boot in position adjacent an opening. The support assembly includes a vertical bracket having a first end and a second end, and an outwardly extending support block is mounted at the first end of the vertical bracket. The support assembly also includes a horizontal bracket extending substantially perpendicular to the vertical bracket. The horizontal bracket is shaped and dimensioned to pass through a connection opening in the second end of the vertical bracket, and the horizontal bracket includes first end and a second end. The first end of the horizontal bracket extends outwardly from the same side of the vertical bracket as the support block. A strap is selectively connected to the exhaust fan. The support assembly is secured to framework of a window by positioning the support block of the vertical bracket upon an upper surface of a ledge defined by the framework of the window. The first end of the horizontal bracket is oriented such that it extends toward an inner surface of the window, and the support assembly is supported from vertical movement by interaction between the upper surface of the ledge defined by the framework of the window and supported from rotational movement by the interaction of the first end of the horizontal bracket with the inner surface of the window.

It is also an object of the present invention to provide an exhaust system wherein wherein the support block is adjustably mounted at the first end of the vertical bracket.

It is another object of the present invention to provide an exhaust system wherein the vertical bracket includes a slot to which the support block is mounted for controlled movement relative thereto.

It is a further object of the present invention to provide an exhaust system wherein a tension screw is interposed between the vertical bracket and the support block to allow for selective release of the support block allowing for controlled movement of the support block relative to the vertical bracket.

It is also an object of the present invention to provide an exhaust system wherein the horizontal bracket is directly connected to the vertical bracket for movement relative thereto.

It is another object of the present invention to provide an exhaust system wherein the first end of the horizontal bracket is provided with a scratch preventing block.

It is a further object of the present invention to provide an exhaust system wherein the strap is secured to and extends downwardly from the second end of the vertical bracket.

It is also an object of the present invention to provide an exhaust system wherein a flange is provided at the second end of the vertical bracket and the strap extends through an aperture formed in the flange.

It is another object of the present invention to provide an exhaust system wherein the strap includes a first end adjustably secured to the vertical bracket and a free second including a fan hook shaped and dimensioned for selective attachment to the exhaust fan.

It is a further object of the present invention to provide an exhaust system wherein a strap stop is provided for controlling movement of the strap relative to the flange.

It is also an object of the present invention to provide an exhaust system wherein the strap stop includes a rod held within a tapered slot such that the rod may be moved from a wide end of the tapered slot to a narrow end of the tapered slot creating friction holding the strap in place.

It is another object of the present invention to provide an exhaust system wherein the strap includes a first end adjustably secured to the vertical bracket and a free second end including a fan hook shaped and dimension for selective attachment to the exhaust fan.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
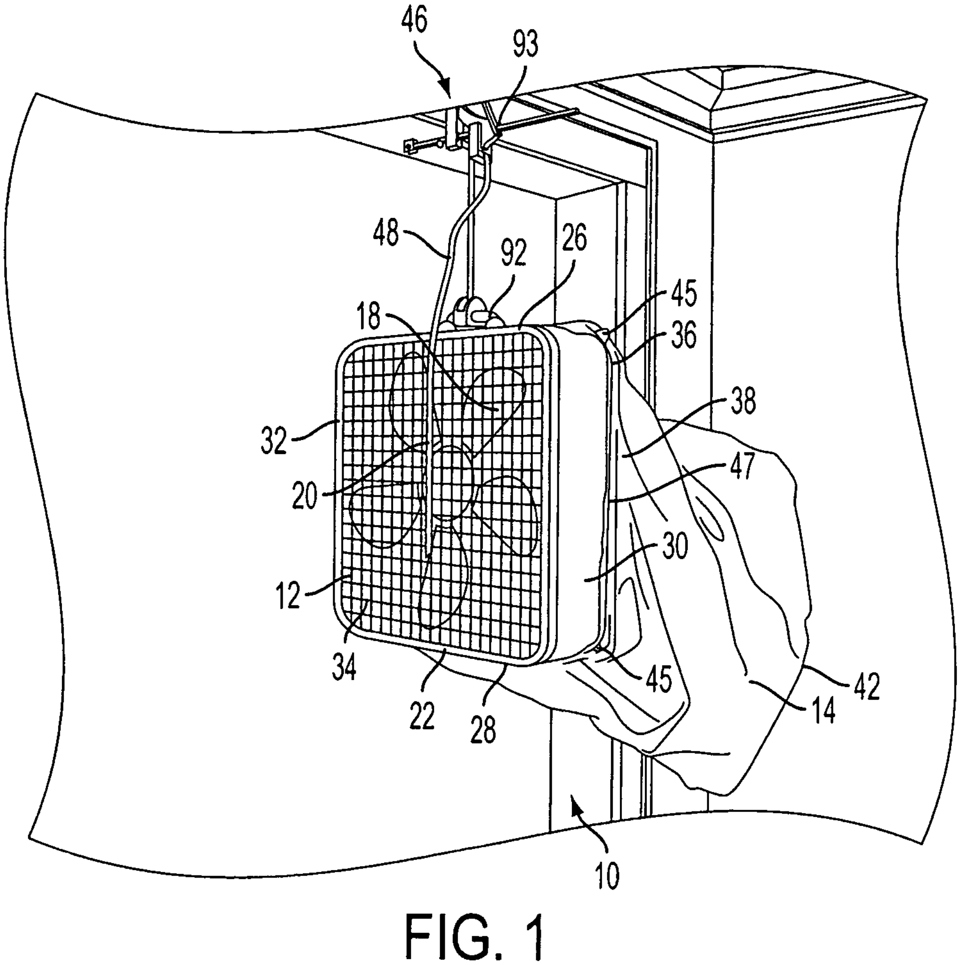
FIG. 1 is a perspective view of the present exhaust system.
Figure 2:
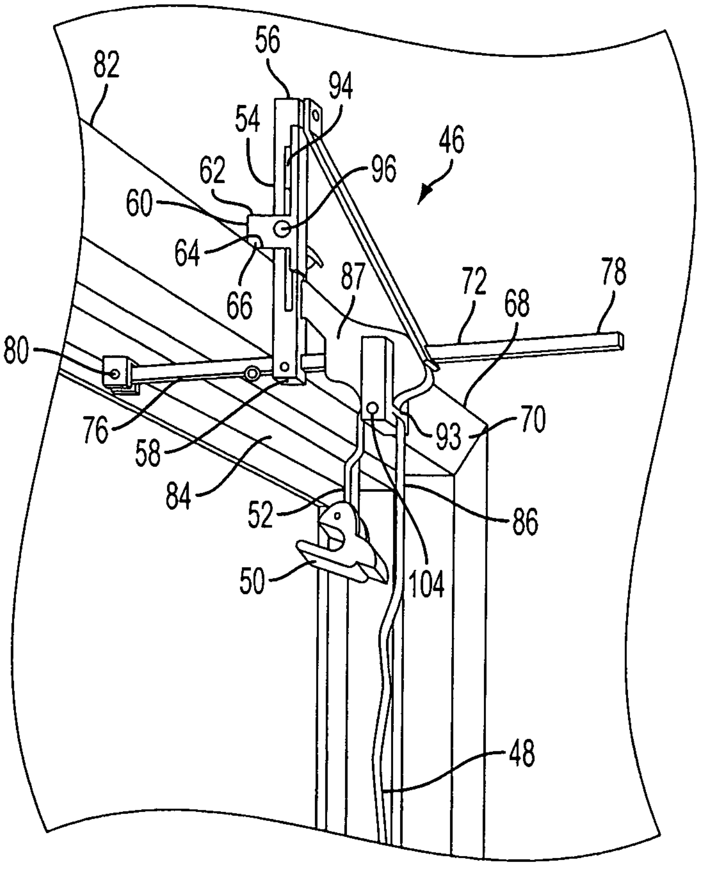
FIGS. 2 and 3 are detailed perspective views of the support assembly of the exhaust system shown in FIG. 1.
Figure 3:
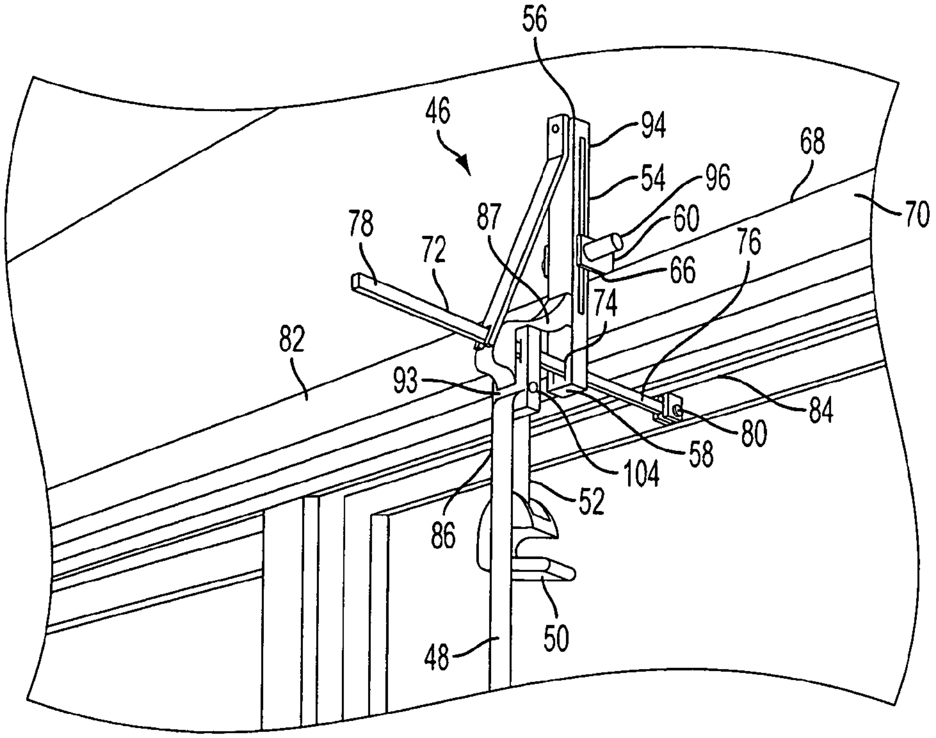
Figure 4:
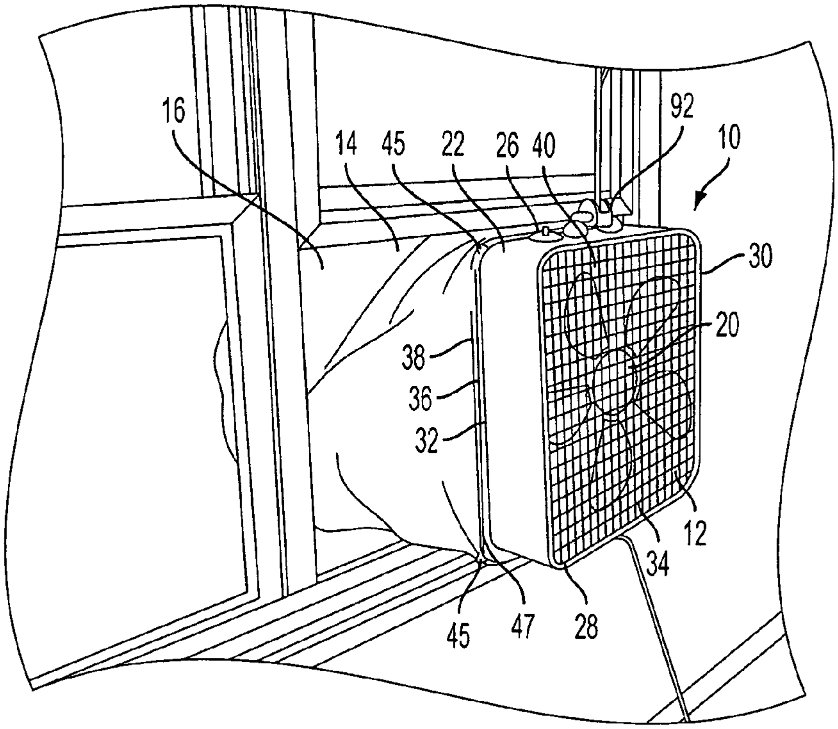
FIGS. 4 and 5 are respectively a detailed interior view of the exhaust fan mounted in a window in accordance with the present invention and a detailed exterior view of the exhaust fan mounted in a window in accordance with the present invention.
Figure 5:
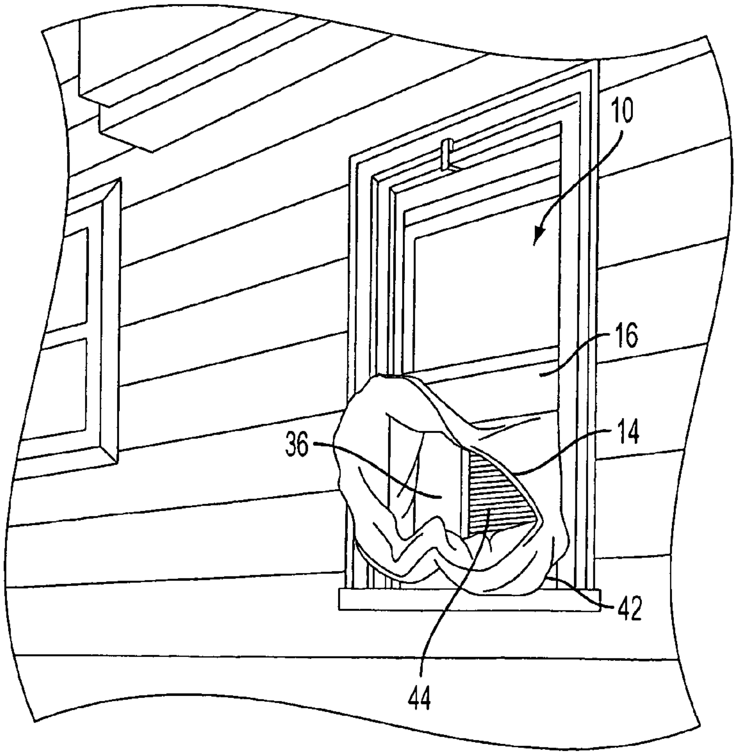
Figure 6:
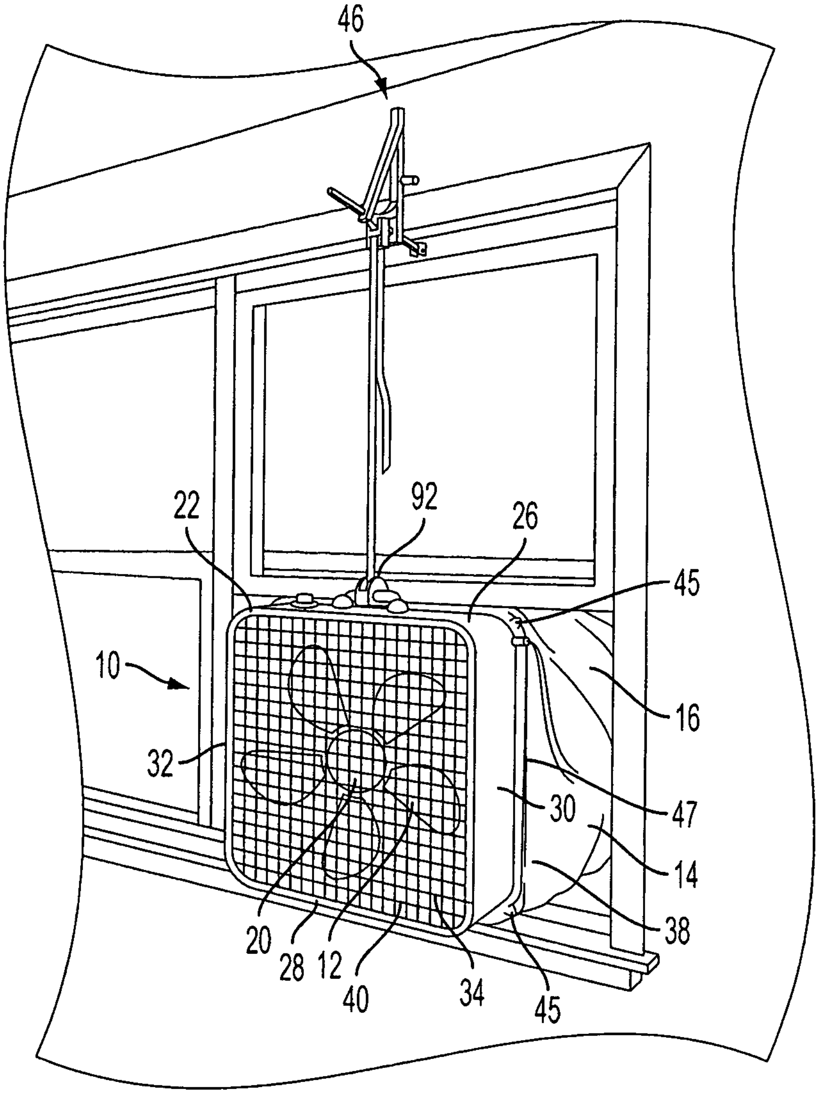
FIG. 6 is a detailed interior view of the exhaust fan mounted in a window in accordance with the present invention.
Figure 7:
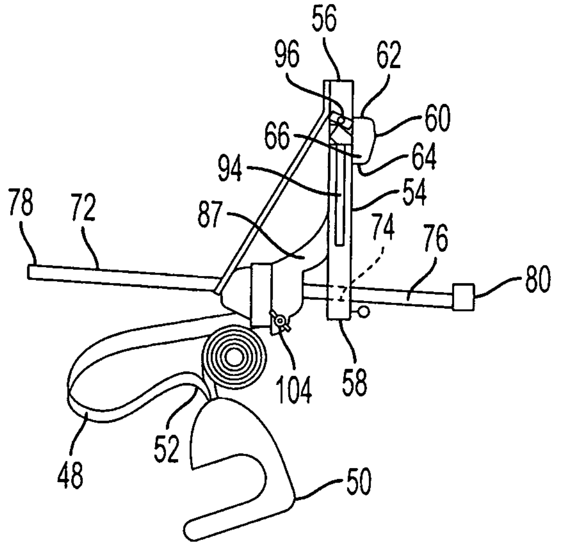
FIG. 7 is a side view of the support assembly shown in FIGS. 2 and 3.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to embodiments disclosed in FIGS. 1 to 7, an exhaust system 10 composed of an exhaust fan 12 and associated flexible exhaust boot 14 are disclosed. The exhaust boot 14 is secured to the exhaust fan 12 and the exhaust fan 12 is placed near a window 16 or other opening with the exhaust boot 14 facing the external environment. When the fan blades 18 of the exhaust fan 12 rotate, they force the exhaust boot 14 to expand thereby filling the opening of the window 16 in which the exhaust fan 12 is positioned and extending outside in a manner directing air flow from the internal room, through the exhaust fan 12 and out the exhaust boot 14. As a result, dust and other particles generated during the work process are removed from the room through the exhaust boot 14 to the outside. Through the use of the present exhaust boot 14, exhaust fans 12 of various sizes may be utilized in conjunction with various sized windows 16 for use in creation of a portable exhaust system 10 ideally adapted for application and use in conjunction with various home construction needs.

As briefly discussed above, the exhaust system 10 includes an exhaust fan 12 with a flexible or malleable exhaust boot 14 secured to the outlet end of the exhaust fan 12. The exhaust fan 12 includes a frame 22 within which fan blades 18 and motor 20 are secured. The frame 22 includes a plurality of sidewalls, that is, an upper sidewall 26, a bottom sidewall 28, a first lateral sidewall 30 and a second lateral sidewall 32, defining an inlet opening 34 and an outlet opening 36 on opposite sides of the frame 22. The flexible exhaust boot 14 is secured to the frame 22 of the exhaust fan 12 adjacent the outlet opening 36. The exhaust boot 14 is a flexible piece of material having a substantially tubular configuration with a first end 38 having an opening 40 and a second end 42 having an opening 44. A support assembly 46 securing the exhaust fan 12 and exhaust boot 14 in position adjacent an opening.

As briefly discussed above, the exhaust fan 12, in accordance with a preferred embodiment, includes a square or rectangular frame 22 within which the fan blades 18 and motor 20 are secured. The inlet opening 34 ultimately is the opening of the frame 22 in which air is drawn based upon the rotation of the fan blades 18 of the exhaust fan 12. The outlet opening 36 is the opening of the frame 22 through which air is pushed as the fan blades 18 of the exhaust fan 12 rotate.

In accordance with a preferred embodiment of the present invention, the exhaust boot 14 is a flexible piece of material composed of plastic, canvas or other durable material. The exhaust boot 14 is formed with a substantially tubular configuration. Accordingly, the exhaust boot 14 includes a first end 38 having an opening 40 and a second end 42 having an opening 44. The first and second ends 38, 42 are connected by the material to define a passageway for the flow of air as discussed below in greater detail.

By securing the first end 38 of the exhaust boot 14 along the frame 22 such that it extends from the outlet opening 36 of the frame 22, air is drawn into the spaced defined by the sidewalls of the exhaust fan 12 and expelled out the outlet opening 36 and into the exhaust boot 14 for exhaust to an external environment. The exhaust boot 14 is secured to the frame 22 by clips 45. The clips 45 are secured to hold the exhaust boot 14 at each corner of the frame 22. An expandable cord 47 is applied around the edge of the exhaust boot 14 and the frame 22 so that upon tightening of the cord 47, the exhaust boot 14 is held tightly around the frame 22 of the exhaust fan 12. However, it is contemplated other securing structures may be employed without departing from the spirit of the claimed invention.

In practice, the exhaust fan 12 is held in a position adjacent the window 16 or other opening via an upper supper assembly 46 coupled to the exhaust fan 12 via a strap 48. The strap 48 is securely attached to the remainder of the support assembly 46 for selective adjustment thereof so as to properly position a fan hook 50 at the second end 52 of the strap 48 into position for attachment to the frame 22 of the exhaust fan 12. As such, the fan hook 50 is secured to the upper sidewall 26 of the frame 22 of the exhaust fan 12.

More particularly, the support assembly 46 relies upon horizontal and vertical brackets 72, 54 and a strap 48 extending between the surrounding framework of the window 16 and the exhaust fan 12. The support assembly 46 includes a vertical bracket 54 having a first end 56 and a second end 58. An adjustable mounted, outwardly extending support block 60 is mounted along the first end 56 of the vertical bracket 54 for controlled movement therealong so as to provide for adjustments as discussed below in greater detail. As will be appreciated based upon the following disclosure, the support block 60 includes an upper surface 62 and a lower surface 64 wherein the lower surface 64 is provided with a rubber bumper 66 for positioning along the upper (or lower) surface 68 of the framework 70 surrounding the window 16.

As will be appreciated based upon the following disclosure, the distance from the upper surface 68 of the ledge 82 defined by the framework 70 of the window 16 to the inner surface 84 of the support frame of the window 16 may vary, and the horizontal bracket 72 is, therefore secured to the vertical bracket 54 for movement relative thereto. In addition, the support block 60 is secured to the vertical bracket 54 for movement relative thereto. More particularly, the vertical bracket 54 is provided with a slot 94 in which the support block 60 is mounted. A tension screw 96 is interposed between the vertical bracket 54 and the support block 60 to allow for selective release of the support block 60 allowing for controlled movement of the support block 60 relative to the vertical bracket 54.

The support assembly 46 further includes a horizontal bracket 72 extending substantially perpendicular to the vertical bracket 54. In fact, the horizontal bracket 72 is shaped and dimensioned to pass through a connection opening 74 in the second end 58 of the vertical bracket 54. In this way, the horizontal bracket 72 is directly connected to the vertical bracket 54 for movement relative thereto. Although not disclosed in accordance with a preferred embodiment of the present invention, it is contemplated controlled positioning of the horizontal bracket relative to the vertical bracket may be is achieved through the use of a lock nut which is locked and released as desired to control relative movement of the horizontal bracket relative to the vertical bracket.

The horizontal bracket 72 includes first end 76 and a second end 78. The first end 76 of the horizontal bracket 72 extends outwardly from the same side of the vertical bracket 54 as the support block 60. The first end 76 of the horizontal bracket 72 is provided with a scratch preventing block 80 such that when the support assembly 46 is positioned as described below it will not scratch the framework 70 of the window 16 to which it is secured.

In practice, the support assembly 46 is secured to the framework 70 of window 16 by positioning the rubber bumper 66 of the support block 60, that is, the lower surface 64 of the support block 60, upon the upper surface 68 of the ledge 82 defined by the framework 70 of the window 16. The first end 76 of the horizontal bracket 72 is oriented such that it extends toward the inner surface 84 of the window 16. As a result, the support assembly 46 is supported from vertical movement by the interaction between the upper surface 68 of the ledge 82 defined by the framework 70 of the window 16 and supported from rotational movement by the interaction of the first end 76 of the horizontal bracket 72 with the inner surface 84 of the support frame of the window 16.

Attachment of the support assembly 46 to the exhaust fan 12 is facilitated via a strap 48 secured to and extending downwardly from the second end 58 of the vertical bracket 54. The strap 48 includes a first end 86 secured to the flange 87 extending from the second end 58 of the vertical bracket 54 and a free second end 52 to which a fan hook 50 is secured. It should be appreciated the flange 87 is provided with an aperture (not shown) shaped and dimensioned for the passage of the horizontal bracket 72 therethrough. The fan hook 50 is shaped and dimensioned for attachment to the frame 22, for example, a handle 92 (or other structure) extending from the upper sidewall 26 of the frame 22, that is, the upper edge of the frame 22. With the frame 22 of the exhaust fan held in this way the exhaust fan may be securely held within the desired opening for exhaust of the room.

Figure 8:
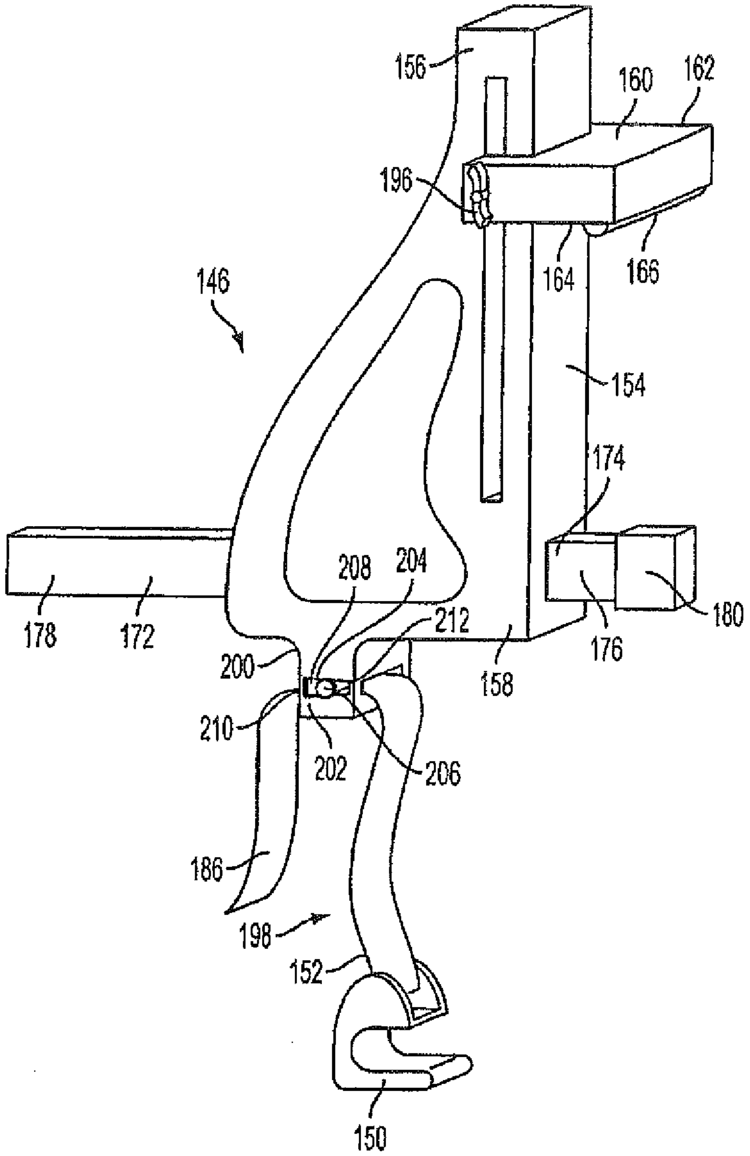
FIG. 8 is a perspective view of a support assembly in accordance with an alternate embodiment.
Figure 9:
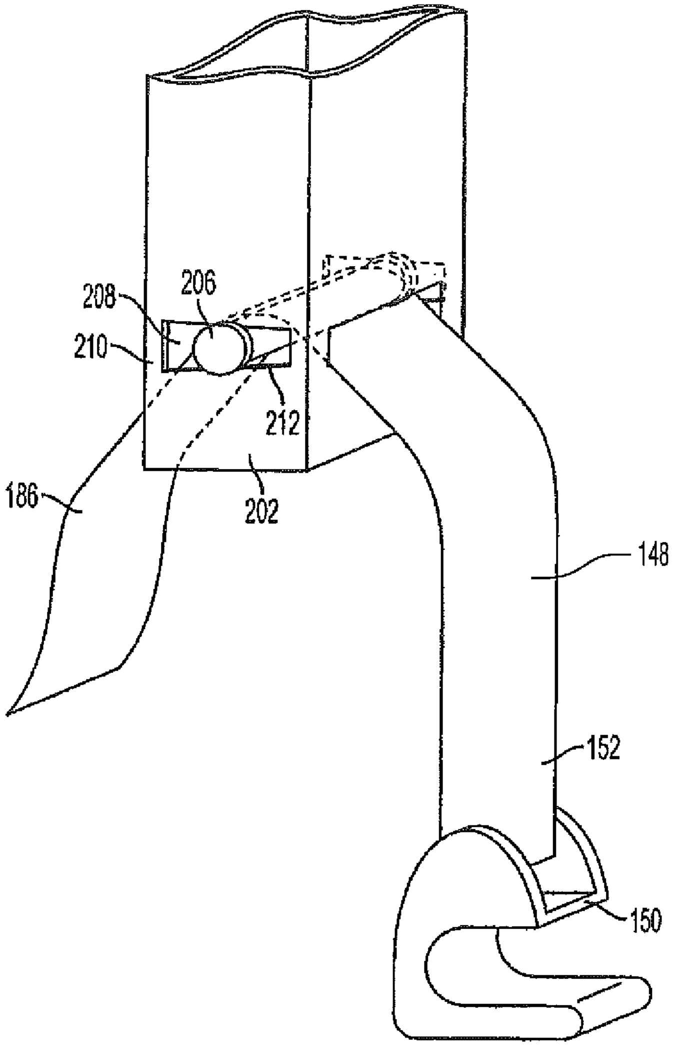
FIG. 9 is a detailed view of the flange of the support assembly shown in FIG. 8.

With regard to the flange 87 supporting the strap 48, the flange 87 is provided with an aperture 93 through which the strap 48 is passed. The first end 86 of the strap is adjustably secured to the aperture 93 via a strap stop 104 and a free second end 52 to which an exhaust fan hook 50 is secured. The strap stop 104 is the same as disclosed below with regard to the embodiment disclosed in FIGS. 8 and 9 and is a conventional friction lock permitting limited movement of the strap 48 based upon the application of selective friction.

Once the exhaust fan 12 is secured in position in front of the opening of the window 16, the exhaust boot 14 is then extended out the window 16 or other opening such that it may be expanded upon actuation of the exhaust fan 12. When the exhaust fan 12 is turned on causing the fan blades 18 to rotate and draw in the inlet opening 34 and out through the outlet opening 36, the exhaust boot 14 expands to fill the opening defined by window 16 thereby sealing off the room and allowing for an unimpeded flow of air from the room to the external environment.

Figure 10:
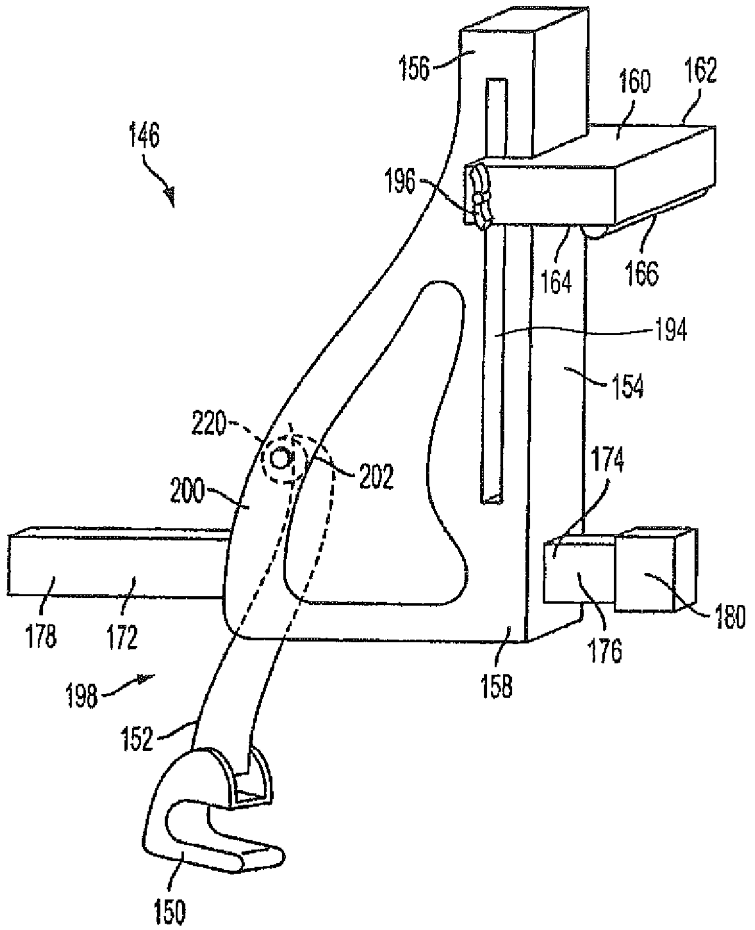
FIG. 10 is a perspective view of another embodiment of a support assembly.

In accordance with an alternate embodiment and with reference to FIGS. 10 and 11, the exhaust fan 12 and exhaust boot 14 are substantially as described above with reference to the embodiment disclosed in FIGS. 1 to 9. This new embodiment, however, employs a different support assembly 146 for the exhaust fan 12.

More particularly, and with reference to FIG. 10, the support arrangement relies upon various support bracket and straps extending between the surrounding framework 70 of the window 16 and the exhaust fan 12. The support assembly 146 includes a vertical bracket 154 having a first end 156 and a second end 158. The first end 156 of the vertical bracket 154 includes an outwardly extending support block 160. As will be appreciated based upon the following disclosure, the support block 160 includes an upper surface 162 and a lower surface 164 wherein the lower surface 164 is provided with a rubber bumper 166 for positioning along the upper surface 68 of the framework 70 surrounding the window 16.

The support assembly 146 further includes a horizontal bracket 172 extending substantially perpendicular to the vertical bracket 154. In fact, the horizontal bracket 172 is shaped and dimensioned to pass through a connection opening 174 in the second end 158 of the vertical bracket 154. In this way, the horizontal bracket 172 is directly connected to the vertical bracket 154 for movement relative thereto. As discussed above, although not disclosed in accordance with a preferred embodiment of the present invention, it is contemplated controlled positioning of the horizontal bracket relative to the vertical bracket may be achieved through the use of a lock nut which is locked and released as desired to control relative movement of the horizontal bracket relative to the vertical bracket.

The horizontal bracket 172 includes first end 176 and a second end 178. The first end 176 of the horizontal bracket 172 extends outwardly from the same side of the vertical bracket 154 as the support block 160. The first end 176 of the horizontal bracket 172 is provided with a scratch preventing block 180 such that when the support assembly 146 is positioned as described below it will not scratch the framework 70 of the window 16 to which it is secured.

In practice, the support assembly 146 is secured to the framework 70 of window by positioning the rubber bumper 166 of the support block 160, that is, the lower surface 164 of the support block 160, upon the upper surface 68 of the ledge 82 defined by the upper framework 70 of the window 16. The first end 176 of the horizontal bracket 172 is oriented such that it extends toward the inner surface of the frame of the window 16. As a result, the support assembly 146 is supported from vertical movement by the interaction between the upper surface 68 of the ledge 82 defined by the upper framework 70 of the window 16 and supported from rotational movement by the interaction of the first end 176 of the horizontal bracket 172 with the inner surface 84 of the support frame of the window 16.

Because the distance from the upper surface 68 of the ledge 82 defined by the framework 70 of the window 16 to the inner surface 84 of the support frame of the window 16 may vary, the horizontal bracket 172 is secured to the vertical bracket 154 for movement relative thereto and the support block 160 is secured to the vertical bracket 154 for movement relative thereto. More particularly, the vertical bracket 154 is provided with a slot 194 in which the support block 160 is mounted. A tension screw 196 is interposed between the vertical bracket 154 and the support block 160 to allow for selective release of the support block 160 allowing for controlled movement of the support block 160 relative to the vertical bracket 154.

Attachment of the support assembly 146 to the exhaust fan 12 is facilitated via a strap assembly 198 secured to and extending downwardly from the second end 158 of the vertical bracket 154. The strap assembly 198 includes a flange 200 secured to and extending downwardly from the second end 158 of the vertical bracket 154. The flange 200 is provided with an aperture 202 through which a strap 148 is passed. The strap 148 includes a first end 186 adjustably secured to the aperture 202 via a strap stop 204 and a free second end 152 to which an exhaust fan hook 150 is secured. The strap stop 204 is a conventional friction lock composed of a rod 206 held within a tapered slot 208 such that the rod 206 may be moved from the wide end 210 of the slot 208, where movement of the strap 148 is permitted because limited friction is applied between the rod 206 and the strap 148, and the narrow end 212 of the slot 208, where movement of the strap 148 is prevented because strong frictional interaction is generated between the strap 148 and the rod 206.

In accordance with an alternate embodiment as shown with reference to FIG. 10, the aperture 202 for the strap 148 is positioned along the side of the flange 200 and the strap stop is replaced with a mechanical retraction system 220, for example, a spring based ratchet system, allowing for controlled extension and retraction of the strap 148.

The exhaust fan hook 150 is shaped and dimensioned for attachment to a handle 92 (or other structure) extending from the upper sidewall of the frame 22, that is, the upper edge of the frame 22. With the frame 22 of the exhaust fan 12 held in this way the exhaust fan 12 may be securely held within the desired opening for exhaust of the room.

It is further contemplated upper and low support assemblies may be used. In particular, and in accordance with the use of upper and lower support assemblies the exhaust fan is held in a position adjacent the window 16 or other opening via upper and lower support members coupled to the exhaust fan via straps. Each of the straps is securely attached to the respective support members for selective adjustment thereof so as to properly position a fan hook at the distal end of the strap into position for attachment to the frame 22 of the exhaust fan. As such, the fan hooks are respectively secured to the upper sidewall and lower sidewall of the frame 22 of the exhaust fan. Thereafter, the straps are tightened to create a secure supporting arrangement for the exhaust fan.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An exhaust system, comprising: an exhaust fan including a frame within which fan blades and a motor are secured, the frame includes an upper sidewall, a bottom sidewall, a first lateral sidewall and a second lateral sidewall, defining an inlet opening and an outlet opening on opposite sides of the frame; a flexible exhaust boot secured to the frame of the exhaust fan adjacent the outlet opening, the exhaust boot is a flexible piece of material having a substantially tubular configuration with a first end having an opening and a second end having an opening; and a support assembly securing the exhaust fan and exhaust boot in position adjacent an opening; the support assembly includes a vertical bracket having a first end and a second end, and an outwardly extending support block is mounted at the first end of the vertical bracket; a horizontal bracket extending substantially perpendicular to the vertical bracket, the horizontal bracket is shaped and dimensioned to pass through a connection opening in the second end of the vertical bracket, and the horizontal bracket includes first end and a second end, the first end of the horizontal bracket extends outwardly from the same side of the vertical bracket as the support block; and a strap selectively connected to the exhaust fan; wherein the support assembly is secured to the framework of a window by positioning the support block of the vertical bracket upon an upper surface of a ledge defined by the framework of the window, and the first end of the horizontal bracket is oriented such that it extends toward an inner surface of the window, and the support assembly is supported from vertical movement by interaction between the upper surface of the ledge defined by the framework of the window and supported from rotational movement by the interaction of the first end of the horizontal bracket with the inner surface of the window, wherein the strap includes a first end adjustably secured to the vertical bracket and a free second end including a fan hook shaped and dimensioned for selective attachment to the exhaust fan; wherein the movement of the strap relative to the vertical bracket is controlled by a strap stop, and wherein the strap stop includes a rod held within a tapered slot such that the rod may be moved from a wide end of the tapered slot to a narrow end of the tapered slot creating a friction holding the strap in place.

2. The exhaust system according to claim 1, wherein the support block is adjustably mounted at the first end of the vertical bracket.

3. The exhaust system according to claim 2, wherein the vertical bracket includes a slot to which the support block is mounted for controlled movement relative thereto.

4. The exhaust system according to claim 3, wherein a tension screw is interposed between the vertical bracket and the support block to allow for selective release of the support block allowing for controlled movement of the support block relative to the vertical bracket.

5. The exhaust system according to claim 1, wherein the horizontal bracket is directly connected to the vertical bracket for movement relative thereto.

6. The exhaust system according to claim 1, wherein the first end of the horizontal bracket is provided with a scratch preventing block.

7. The exhaust system according to claim 1, wherein the strap is secured to and extends downwardly from the second end of the vertical bracket.

8. An exhaust system, comprising: an exhaust fan including a frame within which fan blades and a motor are secured, the frame includes an upper sidewall, a bottom sidewall, a first lateral sidewall and a second lateral sidewall, defining an inlet opening and an outlet opening on opposite sides of the frame; a flexible exhaust boot secured to the frame of the exhaust fan adjacent the outlet opening, the exhaust boot is a flexible piece of material having a substantially tubular configuration with a first end having an opening and a second end having an opening; and a support assembly securing the exhaust fan and exhaust boot in position adjacent an opening; the support assembly includes a vertical bracket having a first end and a second end, and an outwardly extending support block is mounted at the first end of the vertical bracket; a horizontal bracket extending substantially perpendicular to the vertical bracket, the horizontal bracket is shaped and dimensioned to pass through a connection opening in the second end of the vertical bracket, and the horizontal bracket includes first end and a second end, the first end of the horizontal bracket extends outwardly from the same side of the vertical bracket as the support block; and a strap selectively connected to the exhaust fan; wherein the support assembly is secured to the framework of a window by positioning the support block of the vertical bracket upon an upper surface of a ledge defined by the framework of the window, and the first end of the horizontal bracket is oriented such that it extends toward an inner surface of the window, and the support assembly is supported from vertical movement by interaction between the upper surface of the ledge defined by the framework of the window and supported from rotational movement by the interaction of the first end of the horizontal bracket with the inner surface of the window, wherein a flange is provided at the second end of the vertical bracket and the strap extending through an aperture formed in the flange, wherein the strap includes a first end adjustably secured to the vertical bracket and a free second end including a fan hook shaped and dimensioned for selective attachment to the exhaust fan; wherein the movement of the strap relative to the flange is controlled by a strap stop, said strap stop including a rod held within a tapered slot such that the rod may be moved from a wide end of the tapered slot to a narrow end of the tapered slot creating friction holding the strap in place.

9. An exhaust system, comprising: an exhaust fan including a frame within which fan blades and a motor are secured, the frame includes an upper sidewall, a bottom sidewall, first lateral sidewall and a second lateral sidewall, defining an inlet opening and an outlet opening on opposite sides of the frame; a flexible exhaust boot secured to the frame of the exhaust fan adjacent the outlet opening, the exhaust boot is a flexible piece of material having a substantially tubular configuration with a first end having an opening and a second end having an opening; and a support assembly securing the exhaust fan and exhaust boot in position adjacent an opening; the support assembly includes a vertical bracket having a first end and a second end, and an outwardly extending support block is mounted at the first end of the vertical bracket; a horizontal bracket extending substantially perpendicular to the vertical bracket, the horizontal bracket is shaped and dimensioned to pass through a connection opening in the second end of the vertical bracket, and the horizontal bracket includes first end and a second end, the first end of the horizontal bracket extends outwardly from the same side of the vertical bracket as the support block; and a strap selectively connected to the exhaust fan; wherein the support assembly is secured to the framework of a window by positioning the support block of the vertical bracket upon an upper surface of a ledge defined by the framework of the window, and the first end of the horizontal bracket is oriented such that it extends toward an inner surface of the window, and the support assembly is supported from vertical movement by interaction between the upper surface of the ledge defined by the framework of the window and supported from rotational movement by the interaction of the first end of the horizontal bracket with the inner surface of the window, wherein the strap includes a first end adjustably secured to the vertical bracket and a free second end including means for selective attachment to the exhaust fan; wherein the movement of the strap relative to the vertical bracket is controlled by a strap stop, and wherein the strap stop includes a rod held within a tapered slot such that the rod may be moved from a wide end of the tapered slot to a narrow end of the tapered slot creating a friction holding the strap in place.

10. An exhaust system, comprising: an exhaust fan including a frame within which fan blades and a motor are secured, the frame includes an upper sidewall, a bottom sidewall, a first lateral sidewall and a second lateral sidewall, defining an inlet opening and an outlet opening on opposite sides of the frame; a flexible exhaust boot secured to the frame of the exhaust fan adjacent the outlet opening, the exhaust boot is a flexible piece of material having a substantially tubular configuration with a first end having an opening and a second end having an opening; and a support assembly securing the exhaust fan and exhaust boot in position adjacent an opening; the support assembly includes a vertical bracket having a first end and a second end, and an outwardly extending support block is mounted at the first end of the vertical bracket; a horizontal bracket extending substantially perpendicular to the vertical bracket, the horizontal bracket is shaped and dimensioned to pass through a connection opening in the second end of the vertical bracket, and the horizontal bracket includes first end and a second end, the first end of the horizontal bracket extends outwardly from the same side of the vertical bracket as the support block; and a strap selectively connected to the exhaust fan; wherein the support assembly is secured to the framework of a window by positioning the support block of the vertical bracket upon an upper surface of a ledge defined by the framework of the window, and the first end of the horizontal bracket is oriented such that it extends toward an inner surface of the window, and the support assembly is supported from vertical movement by interaction between the upper surface of the ledge defined by the framework of the window and supported from rotational movement by the interaction of the first end of the horizontal bracket with the inner surface of the window, wherein a flange is provided at the second end of the vertical bracket and the strap extending through an aperture formed in the flange, wherein the strap includes a first end adjustably secured to the vertical bracket and a free second end including means for selective attachment to the exhaust fan; wherein the movement of the strap relative to the flange is controlled by a strap stop, said strap stop including a rod held within a tapered slot such that the rod may be moved from a wide end of the tapered slot to a narrow end of the tapered slot creating friction holding the strap in place.

11. The exhaust system according to claim 10, wherein the support block is adjustably mounted at the first end of the vertical bracket.

12. The exhaust system according to claim 10, wherein the vertical bracket includes a slot to which the support block is mounted for controlled movement relative thereto.

13. The exhaust system according to claim 10, wherein a tension screw is interposed between the vertical bracket and the support block to allow for selective release of the support block allowing for controlled movement of the support block relative to the vertical bracket.

14. The exhaust system according to claim 10, wherein the horizontal bracket is directly connected to the vertical bracket for movement relative thereto.

15. The exhaust system according to claim 10, wherein the first end of the horizontal bracket is provided with a scratch preventing block.

16. The exhaust system according to claim 10, wherein the strap is secured to and extends downwardly from the second end of the vertical bracket.

17. An exhaust system, comprising: an exhaust fan including a frame within which fan blades and a motor are secured, the frame includes an upper sidewall, a bottom sidewall, a first lateral sidewall and a second lateral sidewall, defining an inlet opening and an outlet opening on opposite sides of the frame; a flexible exhaust boot secured to the frame of the exhaust fan adjacent the outlet opening, the exhaust boot is a flexible piece of material having a substantially tubular configuration with a first end having an opening and a second end having an opening; and a support assembly securing the exhaust fan and exhaust boot in position adjacent an opening; the support assembly includes a vertical bracket having a first end and a second end, and an outwardly extending support block is mounted at the first end of the vertical bracket; a horizontal bracket extending substantially perpendicular to the vertical bracket, the horizontal bracket is shaped and dimensioned to pass through a connection opening in the second end of the vertical bracket, and the horizontal bracket includes first end and a second end, the first end of the horizontal bracket extends outwardly from the same side of the vertical bracket as the support block; and a strap selectively connected to the exhaust fan; wherein the support assembly is secured to the framework of a window by positioning the support block of the vertical bracket upon an upper surface of a ledge defined by the framework of the window, and the first end of the horizontal bracket is oriented such that it extends toward an inner surface of the window, and the support assembly is supported from vertical movement by interaction between the upper surface of the ledge defined by the framework of the window and supported from rotational movement by the interaction of the first end of the horizontal bracket with the inner surface of the window, wherein the strap includes a first end adjustably secured to the vertical bracket and a free second end including a fan hook shaped and dimensioned for selective attachment to the exhaust fan; wherein the movement of the strap relative to the vertical bracket is controlled by a strap stop, and wherein the strap stop comprises a mechanical retraction system.

18. The exhaust system according to claim 17, wherein the mechanical retraction system comprises a spring based ratchet system allowing for controlled extension and retraction of the strap.

* * * * *